(12) United States Patent
König et al.

(10) Patent No.: US 7,688,977 B2
(45) Date of Patent: Mar. 30, 2010

(54) METHOD FOR ENCRYPTING VIDEO DATA

(75) Inventors: Hartmut König, Dresden (DE); Fuwen Liu, Cottbus (DE)

(73) Assignee: Brandenburgische Technische Universitaet Cottbus, Cottbus (DE)

( * ) Notice: Subject to any disclaimer, the term of this patent is extended or adjusted under 35 U.S.C. 154(b) by 1003 days.

(21) Appl. No.: 11/278,332

(22) Filed: Mar. 31, 2006

(65) Prior Publication Data
US 2007/0237328 A1  Oct. 11, 2007

(51) Int. Cl.
*H04N 7/167* (2006.01)
*H04K 1/06* (2006.01)

(52) U.S. Cl. .......................... 380/210; 380/214; 380/37

(58) Field of Classification Search ................. 380/200, 380/204–242, 28–30, 210, 214, 37
See application file for complete search history.

(56) References Cited
U.S. PATENT DOCUMENTS 5,321,748 A * 6/1994 Zeidler et al. ............... 380/214
5,546,461 A * 8/1996 Ibaraki et al. ............... 380/217
5,815,572 A * 9/1998 Hobbs ........................ 380/215
6,505,299 B1 * 1/2003 Zeng et al. .................. 713/160
2002/0003881 A1 * 1/2002 Reitmeier et al. ........... 380/210
2004/0028227 A1 * 2/2004 Yu ............................. 380/201

OTHER PUBLICATIONS

A. Menezes, P. van Oorshot, and S. Vanstone, Handbook of Applied Cryptography, CRC Press, 1997, section 6.4-6.5 pp. 3-4 of the attached document.*
Fuwen Liu, et al., A Novel Encryption Algorithm for High Resolution Video, Proceeding of ACM NOSSDAV 2005, Stetson, WA, USA, Jun. 2005, pp. 69-74.

* cited by examiner

*Primary Examiner*—Kambiz Zand
*Assistant Examiner*—Michael Guirguis
(74) *Attorney, Agent, or Firm*—Sutherland, Asbill & Brennan, LLC

(57) ABSTRACT

A method for encrypting video data in which the encryption achieves a high standard of security and is carried out at a reduced computation cost. The encryption comprises disordering a set of video data to be encrypted and obscuring the disordered video data.

7 Claims, 2 Drawing Sheets

METHOD FOR ENCRYPTING VIDEO DATA

The invention concerns a method for encrypting video data.

BACKGROUND OF THE INVENTION

Methods for encrypting video data are used to ensure a secure transmission of video data, thus preventing unauthorised third parties from eavesdropping on the video data. Different methods have been proposed.

On the basis of an introductory consideration of known methods for encrypting video data, Liu and König propose ("*A Novel Encryption Algorithm for High Resolution Video*", Proceeding of ACM NOSSDAV'05, Stevenson, Wash., USA, June 2005, pp. 69-74) a method for encrypting video data, which they call "Puzzle method". In this method, a video data set, also called video frame, is obscured in a first method step by partially encrypting with a key stream the video data to be encrypted, and partially linking those video data to each other by means of an exclusive-or (XOR) operation. The video data obscured in this way are subsequently divided into video data blocks. The encryption is completed by interchanging the divided video data blocks in accordance with a permutation list.

It has been shown that, after encrypting the data by means of the known method, cracking the encryption by means of differential attacks by unauthorised third parties could be possible. There is therefore a demand for improving the security against attacks on the encrypted video data.

SUMMARY OF THE INVENTION

It is the object of the present invention to provide a method for encrypting video data, in which the encryption achieves a high standard of security on the one hand, and is carried out at a reduced computation cost on the other.

According to the present invention, this object is solved by a method for encrypting video data in which:
- a set of n video data blocks $VB(b_1 b_2 \ldots b_n)$ is generated from a video data set $V(v_1 v_2 \ldots v_L)$ comprising L data units $v_x (1 \leq x \leq L)$ by partitioning a subset of video data $V'(v_{d+1} v_{d+2} \ldots v_L)$, where n is an even number and d ($d=0, 1, 2, \ldots$) is a number of data units at the beginning of the video data set $V(v_1 v_2 \ldots v_L)$ comprising L data units $v_x$;
- one half of the n video data blocks $VB(b_1 b_2 \ldots b_n)$ is assigned to one half set of video data blocks comprising n/2 first video data blocks and assigning the other half to a second half set of video data blocks comprising n/2 second video data blocks;
- the first video data blocks from the first half set and the second video data blocks from the second half set are interchanged pairwise in accordance with a permutation list $P=p_1 p_2 \ldots p_{n/2}$ to create a temporary cipher text $T=t_1 t_2 \ldots t_{L-d}$, the permutation list $P=p_1 p_2 \ldots p_{n/2}$ being generated by means of a key stream $S(s_1 s_2 \ldots s_l)$ derived from a stream cipher and comprising l key elements, where l is a predefined constant number; and
- subsequently an encrypted set of video data is generated by encrypting the temporary cipher text $T=t_1 t_2 \ldots t_{L-d}$ and a subset of d video data $(v_1 v_2 \ldots v_d)$ from the video data set $V(v_1 v_2 \ldots v_d)$, which remain unaccounted for when generating the set of n video data blocks $VB(b_1 b_2 \ldots b_n)$, into a cipher text $C(c_1 c_2 \ldots c_L)$ comprising L data units $c_y (1 \leq y \leq L)$.

The method ensures a high standard of security, since it requires n! attempts to recreate the original set of video data. For a set of video data divided into, for example, 64 video data blocks, $64! = 1.27 \times 10^{89}$ permutations are possible.

The method is also resistant against attacks on the specific structure of the algorithm. The known method (see Liu and König above) provides attack possibilities for incremental cryptanalysis attacks. One attack possibility consists in characterising the borders of neighbouring video data blocks with similar coefficients and colour values, from which, even after the disordering process, it would be possible to conclude which video data blocks belong together. This would allow the permutation list to be calculated, therefore overcoming the encryption. The method according to the present invention is also resistant against such an attack, since the prior disordering process does no longer link similar video data blocks to be to each other through an exclusive-or operation, which allow an inference on neighbouring video data blocks. The advantages of the long known method, such as the efficiency of the encryption and the independence from a compression algorithm, are hereby retained.

In a practical arrangement of the present invention it is envisaged that the key stream $S(s_1 s_2 \ldots s_l)$ is used in the encryption of the temporary cipher text $T=t_1 t_2 \ldots t_{L-d}$, thus reusing the key stream previously generated in conjunction with the creation of the permutation list, without requiring the generation of a further key stream.

An arrangement of the invention can provide for the use of a further key stream $A(a_1 a_2 \ldots a_d)$ when encrypting the subset of d video data $(v_1 v_2 \ldots v_d)$. Preferably, the key stream $S(s_1 s_2 \ldots s_l)$ and the further key stream $A(a_1 a_2 \ldots a_d)$ are generated with the same key K.

According to a data volume saving development of the present invention, the video data set $V(v_1 v_2 \ldots v_L)$ is processed as a set of compressed video data.

According to a computation cost reducing embodiment of the present invention, the subset of video data $V'(v_{d+1} v_{d+2} \ldots v_L)$ is partitioned into the set comprising n video data blocks $VB(b_1 b_2 \ldots v_n)$, taking into consideration the following boundary conditions:
- the block length B of a video data block shall be $B=2^m$, where m is an integer number; and
- the value of n varies only in the range from mB to 2 mB, where mB is a predefined constant number indicating that the set of video data $V(v_1 v_2 \ldots v_L)$ shall be split into at least mB video data blocks;

m being therefore determined as follows:

$$mB \leq L/2^m < 2mB,$$

and an actual block number n then being defined by:

$$n = \begin{cases} pn & \text{if } pn \text{ is even} \\ pn-1 & \text{if } pn \text{ is odd} \end{cases},$$

where pn is the quotient of L/B.

In a preferred development of the present invention it can be envisaged that the generation of the encrypted set of video data comprises the following steps:
- Carrying out a strong encryption for the subset of d video data $(v_1 v_2 \ldots v_d)$ by linking the d video data $(v_1 v_2 \ldots v_d)$ to a further key stream $A(a_1 a_2 \ldots a_d)$ by means of an exclusive-or (XOR) operation; and
- Carrying out a lightweight encryption for the temporary cipher text $T=t_1 t_2 \ldots t_{L-d}$ by:

encrypting the first l bytes $t_1 t_2 \ldots t_l$ of the temporary cipher text $T = t_1 t_2 \ldots t_{L-d}$ with the key stream $S(s_1 s_2 \ldots s_l)$; and linking the following l bytes $t_{l+1} t_{l+2} \ldots t_{2l}$ of the temporary cipher text $T = t_1 t_2 \ldots t_{L-d}$ to the first l bytes $t_1 t_2 \ldots t_l$ of the temporary cipher text $T = t_1 t_2 \ldots t_{L-d}$ by means of an exclusive-or (XOR) operation.

DESCRIPTION OF PREFERRED EXEMPLARY EMBODIMENTS OF THE INVENTION

The invention will now be described by way of exemplary embodiments with reference to the accompanying drawings in which.

Figure 1:
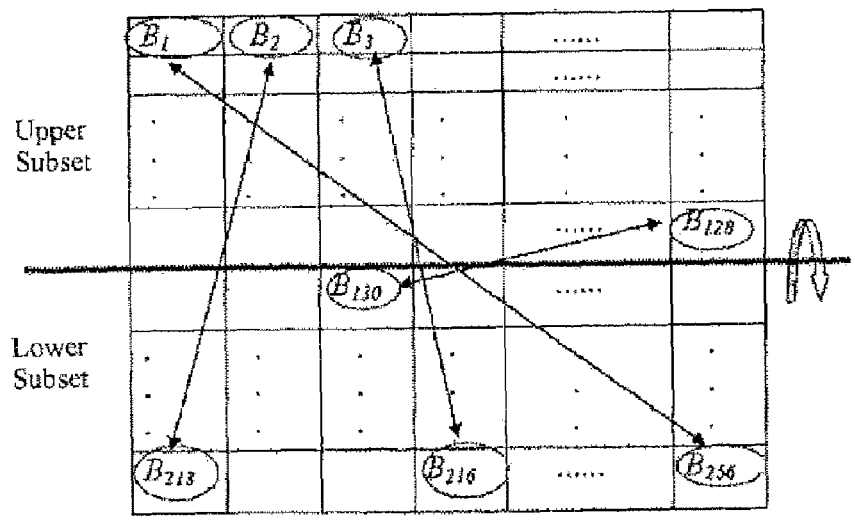
FIG. 1 is a schematic representation explaining an interchange of video data blocks from two subsets of video data blocks.

A method for encrypting a set of video data, preferably available in form of compressed video data, will be described in the following with reference to FIGS. 1 to 3. Individual sets of video data, also called video frame, are individually encrypted. The encryption comprises two steps, namely (i) disordering the set of video data to be encrypted, and (ii) a step for obscuring the disordered video data.

The disordering of video data itself takes place in two steps, in which the set of video data (the video frame) is partitioned into n video data blocks, preferably of equal length, and the n video data blocks are then randomly interchanged.

Division of an L byte long video frame $V(v_1 v_2 \ldots v_L)$ is a typical factoring problem $L = n \times B$. This problem can be solved if one of the two variables (n, B) is assumed as constant. This is difficult, however, since the number L varies for each video frame. A constant value of B can result in very large or very small values of n. A too large value of n is associated with a larger computation cost when the video data blocks are interchanged. If the value of n is too small then the exchange principle is easier to break.

For this reason, the following boundary conditions are formulated with regard to the variables (n,b). Let the length of a video data block B be $B = 2^m$, where m is an integer number. The value of n may vary only in the range from mB to 2 mB, whereby mB is a predefined constant number indicating that the set of video data $V(v_1 v_2 \ldots v_L)$ to be encrypted shall be split into at least min video data blocks; With these boundary conditions, the value of m can be determined as follows:

$$mb \leq L/2^m < 2mb \quad (1)$$

The actual number of video data blocks n is then defined by:

$$n = \begin{cases} pn & \text{if } pn \text{ is even} \\ pn - 1 & \text{if } pn \text{ is odd} \end{cases} \quad (2)$$

where pn is the quotient of L/B. Formula (2) makes the value of n always an even number. This is necessary for disordering the partitioned video data blocks in the next step. Formulas (1) and (2) imply that the product n×B can be unequal to the length of L bytes when pn is odd or L/B results in a remainder. The difference is $$d = L - n \times B \quad (3).$$

In these cases, according to formula (3), d bytes at the beginning of the video frame to be encoded are not taken into account during the disordering process.

This is followed by a step where the n video data blocks generated by partitioning/dividing means are interchanged. Here, the n video data blocks $VB(b_1 b_2 \ldots b_n)$ derived from the compressed video data $V'(V_{d+1} V_{d+2} \ldots v_L)$ are split into two parts with equal numbers of video data blocks: a so-called upper and a so-called lower subset of video data blocks. Each subset consists of n/2 partitioned video data blocks.

The video data blocks of both subsets are now interchanged in accordance to a permutation list $P = p_1 p_2 \ldots p_{n/2}$. The permutation list shown in the exemplary embodiment is derived from a random sequence, in order to resist attacks attempting to find out the original position of the video data blocks. A stream cipher with a key is used for this purpose, for example on the basis of the SEAL or AES-CTR (SEAL—"Software optimized Encryption Algorithm"; AES—"Advanced Encryption Standard"; CTR—"Counter") methods, in order to generate an l bytes long random sequence—the key stream—$S(s_1 s_2 \ldots s_l)$ for the video frame to be encrypted. Because the values of the key stream $S(s_1 s_2 \ldots s_l)$ are different for each video frame to be encrypted, the values of the permutation list are also different.

An exemplary program code for the permutation list $P = p_1 p_2 \ldots p_{n/2}$ generation step is given below:

Algorithm Generating the permutation list

Inut: Key stream $S = s_1 s_2 \ldots s_l$, n—number of blocks in the compressed video sequence V Output: Permutation list $P = p_1 p_2 \ldots p_{n/2}$.

begin

Let A be an auxiliary sequence $A = a_1 a_2 \ldots a_{n/2}$; the value of an element is $a_i = i + n/2$, $1 \leq i \leq n/2$;

Define D as another auxiliary sequence which is used to temporarily save the values selected from the key stream S;

for i=1 to l do // Assign every element S a value ranging from 1+n/2 to n.

if $((s_i \bmod n) \leq n/2)$ $s_i = (s_i \bmod n) + n/2$;

else $s_i = s_i \bmod n$;

end if

Put $s_i$ in the auxiliary sequence D without repetition;

Extract $s_i$ from the sequence A and build the sequence {A-D} end for;

$P = D \| \{A-D\}$ // Generation of the permutation list P, $\|$ denotes the append operation.

end.

Once the permutation list $P = p_1 p_2 \ldots p_{n/2}$ has been generated, a temporary cipher text $T = t_1 t_2 \ldots t_{L-d}$ is created from the (compressed) video data $V'(V_{d+1} V_{d+2} \ldots v_L)$ to be encrypted by interchanging the video data blocks according to the permutation list $P = p_1 p_2 \ldots p_{n/2}$. A short example shall explain the disordering process. Let the video frame V contain 256 blocks: $b_1 b_2 \ldots b_{256}$. The permutation list derived from the key stream S is $P = \{256, 213, 216, \ldots, 130 1\}$. The resulting interchange is shown schematically in FIG. 1.

The interchange of the video data blocks $VB(b_1 b_2 \ldots b_n)$ previously generated by partitioning, which concludes the disordering process, is followed by a so-called obscuring step, which is carried out in the exemplary embodiment by means of a lightweight encryption of the temporary cipher text $T = t_1 t_2 \ldots t_{L-d}$. Only part of the temporary cipher text $T = t_1 t_2 \ldots t_{L-d}$ is hereby encrypted with a stream cipher. In the remaining rest of disordered video data blocks, each is linked to the corresponding preceding block by means of an exclusive-or (XOR) operation.

The procedure is explained in more detail in the following text. The d bytes of compressed video data $(v_1 v_2 \ldots v_d)$, which had not been interchaged, are lined by means of an exclusive-or operation to d bytes of a further key stream A $(a_1 a_2 \ldots a_d)$, which is created from a stream cipher with a key K that had also been used for creating the key stream $S(s_1 s_2 \ldots S_l)$. The first l (l<L) bytes of the temporary cipher text $T=t_1 t_2 \ldots t_{L-d}$, are linked by means of an exclusive-or operation to l bytes of the key stream $S(s_1 s_2 \ldots s_l)$ generated in the disordering step. The reason for preferably using the key stream $S(s_1 s_2 \ldots s_l)$ again, is to make the procedure more efficient. Afterwards, the first l bytes of the temporary cipher text $T=t_1 t_2 \ldots t_{L-d}$ are used as key stream and linked to the following l bytes by means of an exclusive-or operation. The second l bytes are linked to the next l bytes in an analogous manner. This procedure is repeated until the end of the video frame. The output is an L bytes long cipher text $C(c_1 c_2 \ldots t_L)$. The header of the video frame remains unencrypted, since it only contains standard information. Table 1 illustrates the principle of obscuring.

TABLE 1

| Plaintext ⊕(XOR) | $v_1 v_2 \ldots v_d$ | $t_1 t_2 \ldots t_l$ | $t_{l+1} t_{l+2} \ldots t_{2l}$ | $t_{2l+1} t_{2l+2} \ldots t_{3l}$ | $\ldots t_{L-d}$ |
|---|---|---|---|---|---|
| Key stream | $a_1 a_2 \ldots a_d$ | $s_1 s_2 \ldots s_l$ | $t_1 t_2 \ldots t_l$ | $t_{l+1} t_{l+2} \ldots t_{2l}$ | $\ldots t_{L-d-l}$ |
| Cipher text | $c_1 c_2 \ldots c_d$ | $c_{d+1} c_{d+2} \ldots c_{d+l}$ | $c_{d+l+1} c_{d+l+2} \ldots c_{d+2l}$ | $c_{d+2l+1} c_{d+2l+2} \ldots c_{d+3l}$ | $\ldots c_L$ |

In table 1, $v_i$, $s_i$, $a_i$, $c_i$, and $t_i$ denote one byte data. The plaintext comprises the temporary cipher text $T=t_1 t_2 \ldots t_{L-d}$ and the first d bytes of the set of video data (video frame) to be encrypted.

Figure 2:
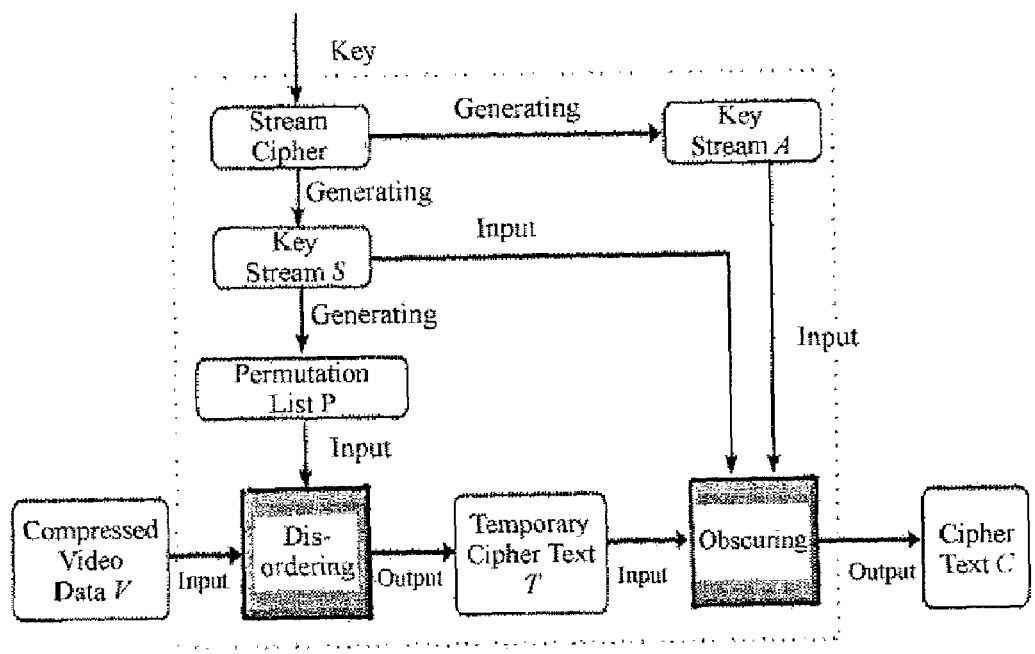
FIG. 2 is a schematic block diagram of an embodiment of a method for encrypting a set of video data.
Figure 3:
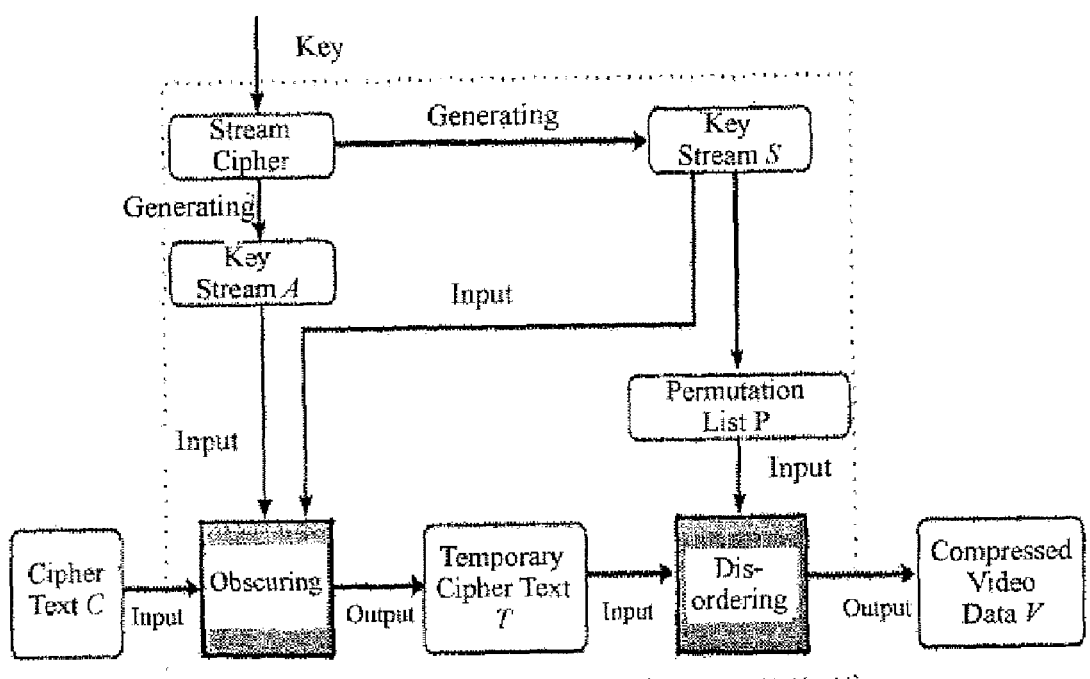
FIG. 3 is a schematic block diagram of an embodiment of a method for decrypting a set of encrypted video data encrypted, for example, by means of the method shown in FIG. 2.

FIG. 2 shows a schematic block diagram of the described method for encrypting a set of video data $V(v_1 v_2 \ldots V_L)$.

The original set of video data $V(v_1 v_2 \ldots v_L)$ can be re-established from the cipher text $C(c_1 c_2 \ldots t_L)$ using the reverse procedure by carrying out the encryption steps in reverse order at the side of the receiver of the cipher text $C(c_1 c_2 \ldots t_L)$. This is illustrated schematically in FIG. 3.

The features of the invention disclosed in the above description, recited in the claims and shown in the drawings, may be important for the realisation of the invention in its various embodiments either individually as well as in arbitrary combination.

The invention claimed is:

1. A computer implemented method for encrypting video data in which:

a set of n video data blocks $VB(b_1 b_2 \ldots b_n)$ is generated from a video data set $V(v_1, v_2 \ldots v_L)$ comprising L data units $v_x$ ($1 \leq x \leq L$) by partitioning a subset of video data $V'(v_{d+1} v_{d+2} \ldots v_L)$, where n is an even number and d (d=0, 1, 2, ...) is a number of data units at the beginning of the video data set $V(v_1 v_2 \ldots v_L)$ comprising L data units $v_x$;

one half of the n video data blocks $VB(b_1 b_2 \ldots b_n)$ is assigned to one half set of video data blocks comprising n/2 first video data blocks and assigning the other half to a second half set of video data blocks comprising n/2 second video data blocks as claimed;

the n/2 first video data blocks from the first half set and the n/2 second video data blocks from the second half set are interchanged pairwise in accordance with a permutation list $P=p_1 p_2 \ldots p_{n/2}$ to create a temporary cipher text $T=t_1 t_2 \ldots t_{L-d}$, the permutation list $P=p_1 p_2 \ldots P_{n/2}$ being generated by means of a key stream $S(s_1 s_2 \ldots s_l)$ derived from a stream cipher and comprising l key elements, where l is a predefined constant number;

subsequently an encrypted set of video data is generated by encrypting the temporary cipher text $T=t_1 t_2 \ldots t_{L-d}$ and a subset of d video data $(v_1 v_2 \ldots v_d)$ from the video data set $V(v_1 v_2 \ldots v_L)$, which remain unaccounted for when generating the set of n video data blocks $VB(b_1 b_2 \ldots b_n)$ into a cipher text $C(c_1 c_2 \ldots c_L)$ comprising L data units cy ($1 \geq y \geq L$);

wherein the prior steps are performed by a computer.

2. A method according to claim 1, characterized in that the key stream $S(s_1 s_2 \ldots s\, 1)$ is used in the encryption of the temporary cipher text $T=t_1 t_2 \ldots t_{L-d}$.

3. A method according to claim 1, characterized in that a further key stream $A(a_1 a_2 \ldots a_d)$ is used when encrypting the subset of d video data $(v_1 v_2 \ldots v_d)$.

4. A method according to claim 2, characterized in that a further key stream $A(a_1 a_2 \ldots a_d)$ is used when encrypting the subset of d video data $(v_1 v_2 \ldots v_d)$ and the key stream $S(s_1 s_2 \ldots s_l)$ and the further key stream $A(a_1 a_2 \ldots a_d)$ are created with the same key K.

5. A method according to claim 1, characterized in that the set of video data $V(v_1 v_2 \ldots v_L)$ is processed as a set of compressed video data.

6. A method according to claim 1, characterized in that the subset of video data $V'(v_{d+1} v_{d+2} \ldots v_L)$ is partitioned into the set comprising n video data blocks $VB(b_1 b_2 \ldots b_n)$ taking into consideration the following boundary conditions:

a block length B of a video data block shall be $B=2^m$, where m is an integer number; and the value of n varies only in a range from mB to 2mB, where mB is a predefined constant number indicating that the set of video data $V(v_1 v_2 \ldots v_L)$ is split into at least mB video data blocks;

m being therefore determined as follows:

$$mB \leq L/2^m < 2mB,$$

and an actual block number n then being defined by:

$$n = \begin{cases} pn & \text{if } pn \text{ is even} \\ pn-1 & \text{if } pn \text{ is odd} \end{cases},$$

Where pn is a quotient of L/B.

7. A method according to claim 3, characterized in that the generation of the encrypted set of video data comprises the following steps:

Carrying out a strong encryption for the subset of d video data $(v_1 v_2 \ldots v_d)$ by linking the d video data $(v_1 v_2 \ldots v_d)$ to a further key stream $A(a_1 a_2 \ldots a_d)$ by means of an exclusive-or (XOR) operation; and Carrying out a lightweight encryption for the temporary cipher text $T=t_1 t_2 \ldots t_{L-d}$ by:

encrypting the first l bytes $t_1 t_2 \ldots t_l$ of the temporary cipher text $T = t_1 t_2 \ldots t_{L-d}$ with the key stream $S(s_1 s_2 \ldots s_l)$; and linking the following l bytes $t_{l+1} t_{l+2} \ldots t_{2l}$ of the temporary cipher text $T = t_1 t_2 \ldots t_{L-d}$ to the first l bytes $t_1 t_2 \ldots t_l$ of the temporary cipher text $T = t_1 t_2 \ldots t_{L-d}$ by means of an exclusive-or (XOR) operation for the entire temporary cipher text.

* * * * *